US009363483B2

(12) United States Patent
Bulan et al.

(10) Patent No.: US 9,363,483 B2
(45) Date of Patent: Jun. 7, 2016

(54) METHOD FOR AVAILABLE PARKING DISTANCE ESTIMATION VIA VEHICLE SIDE DETECTION

(71) Applicant: XEROX CORPORATION, Norwalk, CT (US)

(72) Inventors: Orhan Bulan, Rochester, NY (US); Yao Rong Wang, Webster, NY (US); Wencheng Wu, Webster, NY (US); Robert Loce, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 465 days.

(21) Appl. No.: 13/922,091

(22) Filed: Jun. 19, 2013

(65) Prior Publication Data

US 2014/0375804 A1    Dec. 25, 2014

(51) Int. Cl.
*G06K 9/00* (2006.01)
*H04N 7/18* (2006.01)
*G08G 1/04* (2006.01)
*G08G 1/14* (2006.01)

(52) U.S. Cl.
CPC .............. *H04N 7/18* (2013.01); *G06K 9/00771* (2013.01); *G08G 1/04* (2013.01); *G08G 1/142* (2013.01); *G08G 1/144* (2013.01); *G08G 1/147* (2013.01)

(58) Field of Classification Search
None
See application file for complete search history.

(56) References Cited

U.S. PATENT DOCUMENTS

| | | | |
|---|---|---|---|
| 6,285,297 B1 | 9/2001 | Ball | |
| 2003/0144890 A1* | 7/2003 | Dan | G06Q 30/02 705/5 |
| 2009/0167866 A1* | 7/2009 | Lee | G06K 9/3233 348/159 |
| 2009/0322565 A1* | 12/2009 | Faber | B62D 15/027 340/932.2 |
| 2014/0003708 A1* | 1/2014 | Datta | G06K 9/6256 382/159 |
| 2014/0036076 A1* | 2/2014 | Nerayoff | H04N 7/181 348/148 |

OTHER PUBLICATIONS

Csurka, Gabriella et al. Visual Categorization with Bags of Keypoints. ECCV SLCV, 2004, 16 Pages.
Perronnin, Florent et al. Fisher Kernels on Visual Vocabularies for Image Categorization. CVPR, 2000, 8 Pages.
Nilsson, Mikael et al. Face Detection Using Local SMQT Features and Split Up Snow Classifier. IEEE International Conference on Acoustics, Speech, and Signal Processing, 2007, pp. 589-592.
Dalal, Navneet et al. Histograms of Oriented Gradients for Human Detection, CVPR, 2005, 8 Pages.
Perronnin, Florent et al. Improving the Fisher Kernel for Large-Scale Image Classification. ECCV, 2010, 14 Pages.

(Continued)

*Primary Examiner* — Kevin McInnish
(74) *Attorney, Agent, or Firm* — MH2 Technology Law Group LLP

(57) ABSTRACT

A computer-implemented method, system, and computer-readable medium is disclosed for determining an estimated available parking distance for a vehicle via vehicle side detection in one or more image frames from an operational video. The operational video can be acquired from a fixed parking occupancy video camera and can include a field of view associated with a parking region. The method can include obtaining operational video from a fixed parking occupancy video camera; detecting, within a region of interest (ROI) of the one or more image frames from the operational video, a side of one or more vehicles parked in a parking region facing a traffic lane using a trained classifier that is trained to detect the side of the one or more vehicles; and determining an estimated available parking distance based on the side of the one or more vehicles that are detected.

18 Claims, 9 Drawing Sheets

(56) References Cited

OTHER PUBLICATIONS http://en.wikipedia.org/wiki/Hough_transform, Hough transform. Wikipedia, Printed on Jun. 20, 2013, pp. 1-8.

Bulan, O. et al. A System and Method for Available Parking Space Estimation for Multispace On-Street Parking. U.S. Appl. No. 13/441,269, filed Apr. 6, 2012.

Wu, W. et al. Methods and System for Automated In-Field Hierarchical Training of a Vehicle Detection System. U.S. Appl. No. 13/836,310, filed Mar. 15, 2013.

Ojala, Timo et al. Gray Scale and Rotation Invariant Texture Classification with Local Binary Patterns. Computer Vision—ECCV 2000. Springer Berlin Heidelberg, 2000, 17 Pages.

* cited by examiner

METHOD FOR AVAILABLE PARKING DISTANCE ESTIMATION VIA VEHICLE SIDE DETECTION

BACKGROUND

The present disclosure relates to a video-based method and system for efficient vehicle detection/localization in still images obtained from a fixed video camera. The disclosed method and system are applicable to parking space management. However, it is to be appreciated that the present exemplary embodiments are also applicable to other like applications.

One challenge that parking management companies face while managing on-street parking is an accurate detection of available spaces. Conventional methods for detecting vehicle occupancy in parking spaces include non-video based sensing solutions. For example, "puck-style" sensors, shown in FIG. 1, typically use magnetometer readings to sense when a vehicle is detected in a parking space. The detected information is wirelessly communicated to interested parties. One disadvantage associated with these sensor-based methods is a high cost for installation and maintenance of the sensors. In addition, the maintenance or replacement of a sensor may reduce parking efficiency if a parking space is made unavailable for the service work.

Another method being explored is a video-based solution. This method is shown in FIG. 2 and includes monitoring on-street parking spaces using non-stereoscopic video cameras. The cameras output a binary signal to a processor, which uses the data for determining occupancies of the parking spaces.

One shortcoming of both technologies is that they are designed for, and limited to, single-space parking configurations. On-street parking can be provided in two different configurations. A first configuration is shown in FIG. 3 and includes single-space parking, also known as stall-based parking, in which each parking space is defined in a parking area by clear boundaries. The parking spaces are typically marked by lines (shown in phantom) that are painted on the road surface to designate one parking space per vehicle. The second configuration is shown in FIG. 4 and includes multi-space parking, in which a long section of street is designated as a parking area to accommodate multiple vehicles. In this configuration, there are no predefined boundaries that designate individual parking stalls, so a vehicle can park at any portion extending along the parking area. In many instances, the multi-space parking configurations are more efficient because, when spaces are undesignated, drivers aim to fit more vehicles in a multi-space parking area having a same length as a single-space parking area.

At present, many departments of transportation are transitioning from single-space parking configurations to the multi-space parking configurations. Cities are eliminating traditional parking meters and single-space parking configurations to reduce maintenance and other costs. The sensor-based methods are best suited for parking areas where painted lines typically demark a defined parking space for a single vehicle. However, an incorporation of the sensor-based methods for use in multi-space parking configurations is conceptually difficult and expensive to continue. Accordingly, alternatives that are better suited for the multi-space setting are needed.

Given the comparatively lower cost of a video surveillance camera, a video-based solution offers a better value if it is incorporated into a management scheme for monitoring multi-space parking configurations, as well as some applications of single-space street parking. Another advantage of a video-based solution is that one video camera can typically monitor and track several parking spots, whereas multiple sensors may be needed to reliably monitor one parking space in the single-space parking configuration. Additionally, maintenance of the video cameras is likely to be less disruptive than maintenance of in-ground sensors.

INCORPORATION BY REFERENCE

U.S. Pat. No. 6,285,297, issued Sep. 4, 2001, by Jay H. Ball, and entitled "Determining The Availability Of Parking Spaces";

U.S. application Ser. No. 13/836,310, filed Mar. 15, 2013, by Wu et al., entitled "Methods and System for Automated In-Field Hierarchical Training Of Vehicle Detection System";

U.S. application Ser. No. 13/441,294, filed Apr. 6, 2012, by Bernal et al., entitled "Video-Based Detector And Notifier For Short-Term Parking Violation Enforcement";

U.S. application Ser. No. 13/441,253, filed Apr. 6, 2012, by Bulan et al., entitled "Video-Based System And Method For Detecting Exclusion Zone Infractions";

U.S. application Ser. No. 13/441,269, filed Apr. 6, 2012, by Bulan et al., and entitled "A System And Method For Available Parking Space Estimation For Multispace On-Street Parking";

U.S. application Ser. No. 13/461,191, filed May 1, 2012, by Fan et al., entitled "System And Method For Street-Parking-Vehicle Identification Through License Plate Capturing";

U.S. application Ser. No. 13/684,817, filed Nov. 26, 2012, by Wang et al., entitled "System And Method For Estimation Of Available Parking Space Through Intersection Traffic Counting";

http://streetsmarttechnology.com, 2 pages, copyright 2011;

http://www.alibaba.com/productgs/373281312/Ultrasonic_Parking_Sensor.html 3 pages, copyright 1999-2013;

http://en.wikipedia.org/wiki/Hough_transform; 10 pages, Jan. 9, 2013;

http://www.cs.brown.edu/-pff/latent/, version 5, Sep. 5, 2012, 3 pages (http:people.cs.uchicago.edu/-rbg/latent);

N. Dalal and B. Triggs "Histograms Of Oriented Gradients For Human Detection", in 2005, CVPR, 8 pages;

T. Ojala, M. Pietikainen, and D. Harwood, "A Comparative Study Of Texture Measures With Classification Based On Feature Distributions", 1996 Pattern Recognition, volume 29, pages 51-59, Department of Electrical Engineering, Oulu, Finland;

M. Nilsson, J. Nordberg, and I. Claesson, "Face Detection Using Local Smqt Features And Split Up Snow Classifier", IEEE International Conference on Acoustics, Speech, and Signal Processing, 2007, Blekinge Institute of Technology, Ronneby, Sweden, pages 11-589 to 11-592;

F. Perronnin and C. Dance, "Fisher Kernels On Visual Vocabularies For Image Categorization", CVPR, 2007, Xerox Research Centre Europe, Meylan, France, 8 pages;

G. Csurka, C. Dance, J. Willamowski, L. Fan and C. Bray, "Visual Categorization With Bags Of Keypoints", ECCV SLCV, 2004, 16 pages;

F. Perronnin, J. Sanchez and T. Mensink, "Improving The Fisher Kernel For Large-Scale Image Classification", ECCV, 2010, Xerox Research Centre Europe, 14 pages;

A. Neubeck and L. V. Gaol, "Efficient Non-Maximum Suppression", ICPR, 2006, Computer Vision Lab, Zurich, Switzerland, 6 pages;

P. Felzenszwalb, R. Girshick, D. McAllester, D. Ramanan, "Object Detection With Discriminatively Trained Part-Based Models," IEEE Transactions on Pattern Analysis and Machine Intelligence, Vol. 32, No. 9, September 2010, pages 1627-1645; and Constantine Papageorgiou and Tomaso Poggio, "A Trainable System For Object Detection", International Journal of Computer Vision, 38 (1), pages 15-33, 2000, Netherlands; are incorporated herein by reference in their entirety.

SUMMARY

In implementations, a computer-implemented method is disclosed for determining an estimated available parking distance for a vehicle via vehicle side detection in one or more image frames from an operational video, the operational video acquired from a fixed parking occupancy video camera comprising a field of view associated with a parking region. The method can comprise obtaining operational video from a fixed parking occupancy video camera; detecting, within a region of interest (ROI) of the one or more image frames from the operational video, a side of one or more vehicles parked in a parking region facing a traffic lane using a trained classifier that is trained to detect the side of the one or more vehicles; and determining an estimated available parking distance based on the side of the one or more vehicles that are detected.

In implementations, the estimated available parking distance can be between adjacently parked vehicles, a front portion of a parked vehicle and a parking lane boundary, or a rear portion of a parked vehicle and a parking lane boundary.

In implementations, the fixed parking occupancy video camera can comprise a field of view, wherein an image plane of the fixed occupancy video camera is oblique or parallel to a street direction on which the one or more vehicles are parked.

In implementations, the method can further comprise training the classifier, wherein training the classifier comprises obtaining additional video from the fixed parking occupancy video camera; extracting one or more positive samples and one or more negative samples from the additional video that was obtained; extracting a set of features from the one or more positive samples and a set of features from the one or more negative samples; and training the classifier via machine learning techniques.

In implementations, the detecting the side of the one or more vehicles can further comprise performing a sliding window-based space search for the side of the vehicle within video that was obtained. The sliding window-based space search can comprise extracting one or more features associated with each of a plurality of windows and accessing an operatively associated classifier to classify each window as including the side of the vehicle or not including the side of the vehicle.

In implementations, the parking distance can be estimated using a look-up table (LUT) and the vehicle side that was detected. The LUT can store various image pixel locations and their corresponding real-world coordinates of an outer boundary of the parking region.

In implementations, the distance between two vehicles can be estimated based on the pixel locations of the corners of two vehicles that are facing the traffic lane between the two vehicles in the ROI.

In implementations, the set of features can comprise one or more local image descriptors, wherein the one or more local image descriptors can comprise any, or combinations of, a color attribute-based features, texture-based features, scale invariant features, a bag of visual words, and Fisher vectors.

In implementations, the one or more positive samples and the one or more negative samples can be extracted from a carved out region of the video using a hierarchical training approach. The one or more positive samples can comprise images of sides of different vehicles parked along a street facing traffic lane. T one or more negative samples can comprise any, or combinations of, a background image from the parking region, a rear portion of the parked vehicles in the video, a middle portion of the parked vehicles, and a front portion of the parked vehicles in the video.

In implementations, the classifier comprises a linear classifier, wherein the linear classifier can be a linear Support Vector Machine (SVM), a non-linear classifier, and can be trained using features extracted from a set of training samples and one or more labels of the training samples. The classifier can be trained using a machine learning process.

In implementations, a vehicle detection system associated with a parking region is disclosed. The vehicle detection system can comprise a fixed parking occupancy video camera including a field of view associated with a parking region; and a controller operatively associated with the fixed parking occupancy video camera, the controller configured to execute computer instructions to perform a process of determining an estimated distance between vehicles from one or more image frames in operational video including: obtaining operational video from a fixed parking occupancy video camera; detecting, within a region of interest (ROI) of the one or more image frames from the operational video, a side of one or more vehicles parked in a parking region facing a traffic lane using a trained classifier that is trained to detect the side of the one or more vehicles; and determining an estimated parking distance based on the side of the one or more vehicles that are detected.

In implementations, a computer readable storage medium is disclosed that comprises instructions that cause one or more processors to perform a method comprising: obtaining operational video from a fixed parking occupancy video camera detecting, within a region of interest (ROI) of the one or more image frames from the operational video, a side of one or more vehicles parked in a parking region facing a traffic lane using a trained classifier that is trained to detect the side of the one or more vehicles; and determining an estimated parking distance based on the side of the one or more vehicles that are detected.

DETAILED DESCRIPTION

This disclosure provides a computationally efficient vision-based vehicle detection method and system from images acquired with fixed cameras operatively associated with a parking occupancy management system.

According to an exemplary method, fast and efficient localization of vehicles within a region of interest (ROI) associated with an on-street, i.e. curb parking region. A still image/video frame including the parking region is provided where a camera and ROI within a field of view associated with the camera are fixed. The method includes two phases: 1) offline (training) phase, and 2) online (operational) phase. In one exemplary embodiment of the disclosed method, the offline (training) phase includes, a) Obtaining video from a parking occupancy camera; b) Extracting positive samples (i.e., sides of different vehicles parked along the street facing traffic lane) and negative samples (e.g., portions of background images of a street without a vehicle present or front/rear portions of parked vehicles) from the captured video; and c) Extracting a set of features from the positive and negative samples and training a classifier using the extracted features and class labels for each sample. During the online (operational) phase of the embodiment, the following steps are performed; d) Obtaining an image/video frame from the camera; e) Detecting the parked vehicle side facing the traffic lane using the classifier trained in the offline phase; and f) Estimating the available parking distance for a vehicle, e.g, between adjacently parked vehicles, between a front portion of a parked and a parking area boundary, or between a rear portion of a parked vehicle and a parking lane boundary, using the a look-up table (LUT) of the camera calibration that calibrates the traffic side of the parking area, which converts pixel to real-world length units, and the detected vehicle side on the image plane.

Figure 6:
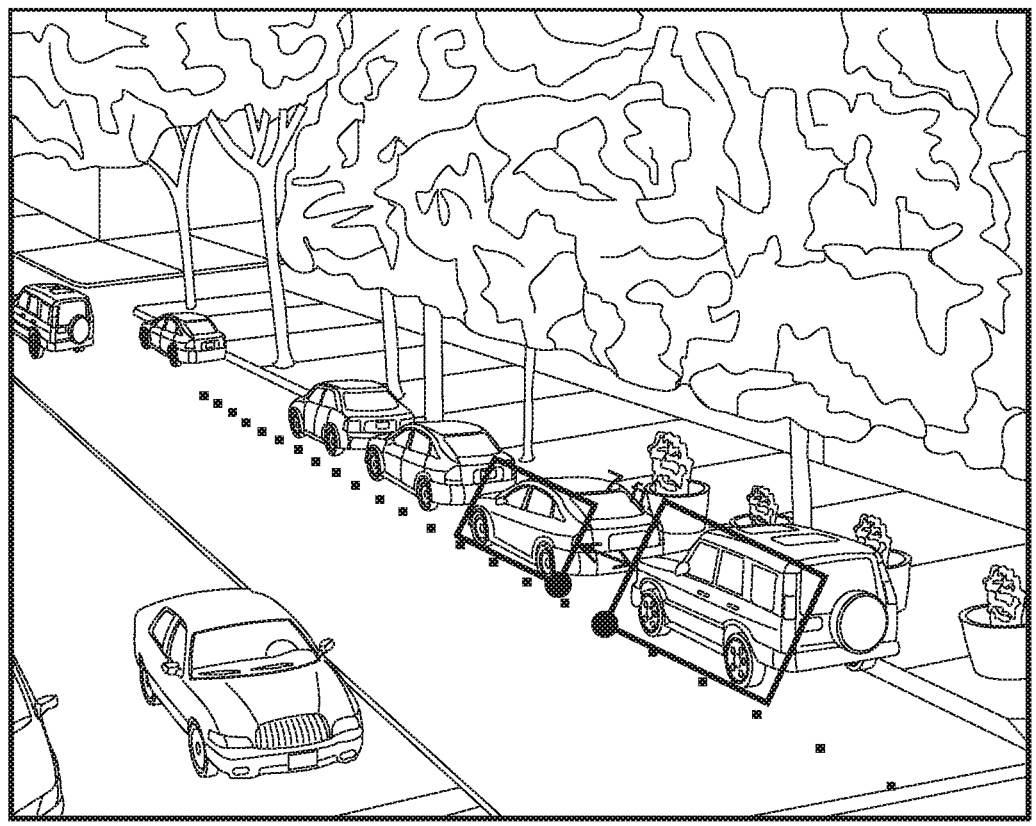
FIG. 6 illustrates an example calibration procedure according to an exemplary embodiment of this disclosure.

The vehicle detection method and system can be implemented using one or more platforms, modules, and/or processes that can perform functions including video processing, vehicle detection, and distance estimation. Each function, in turn, can be implemented by using one or more sub-platform, modules, and/or processes. For example, the video processing functionality can include, for example, but not limited to, motion detection, background modeling & subtraction, occlusion detection, etc., and can be used to determine which frames and regions in one or more image frames occurred from a video in which a new parked vehicle may exist. These frames/regions are called candidate regions. The vehicle detection functionality can perform a search in these candidate regions to locate the vehicles. The vehicle detection functionality can be implemented using standard computer vision and machine learning tools to train a classifier (offline) and use the trained classifier in the online phase. Once vehicles are detected on the image plane, the physical distance between the detected vehicles can be estimated by using image-based distance estimation techniques. The distance estimation functionality can use an offline calibration procedure to estimate the available physical distance. For this purpose, in the camera installation, a calibration tape can be laid down along a traffic side of a parking area on a street. Using the calibration tape, a look-up table (LUT) can be created, denoted by $LUT_{outer}$. The physical distance between two detected vehicles is then estimated through the following steps. Step 1) For the vehicle detected on the left on the image plane, identify the bottom rightmost pixel and for the vehicle detected on the right identify the bottom leftmost pixel. Let them be denoted by Pr and $P_l$. In FIG. 6, the points show Pr and $P_l$. Step 2) The physical distance between two vehicles can then be calculated based on the two pixels and the LUT, as described below. In some implementations, other calibration and distance estimation techniques can be used, for example, but not limited to, by using physical objects and/or features that have a known size and/or distance, a mapping between physical coordinates and image/video coordinates, i.e., pixel locations, can be calculated.

As briefly discussed above, the method and system disclosed herein is composed of two phases, 1) offline (training) phase, and 2) online phase. Described now are further details of the vehicle detection method and system to facilitate a better understanding.

According to one exemplary embodiment of the disclosed method, the offline (training) phase includes the following steps:

a) Obtaining video from a parking camera;

b) Extracting positive samples (i.e., sides of different cars parked along the street facing traffic lanes) and negative samples (e.g., portions of background images of a street without vehicles or front/rear portions of parked vehicles) from the captured video; and c) Extracting a set of features from positive and negative samples and training a classifier using the extracted features and the class labels for each sample.

The offline process may be performed at the camera installation/setup. Once the video cameras are set-up and the offline processing is completed, vehicles can be localized in each frame using the trained classifier. This is what is referred to as the online phase. During the online phase of the exemplary embodiment, the following steps are performed:

d) Obtaining an image/video frame from the camera;

e) Detecting the parked vehicle side facing the traffic lane using the classifier trained in the offline phase; and f) Estimating the available distance for a vehicle using the outer LUT and the detected vehicle side on the image plane.

Details of the Offline (Training) Phase.

Figure 1:
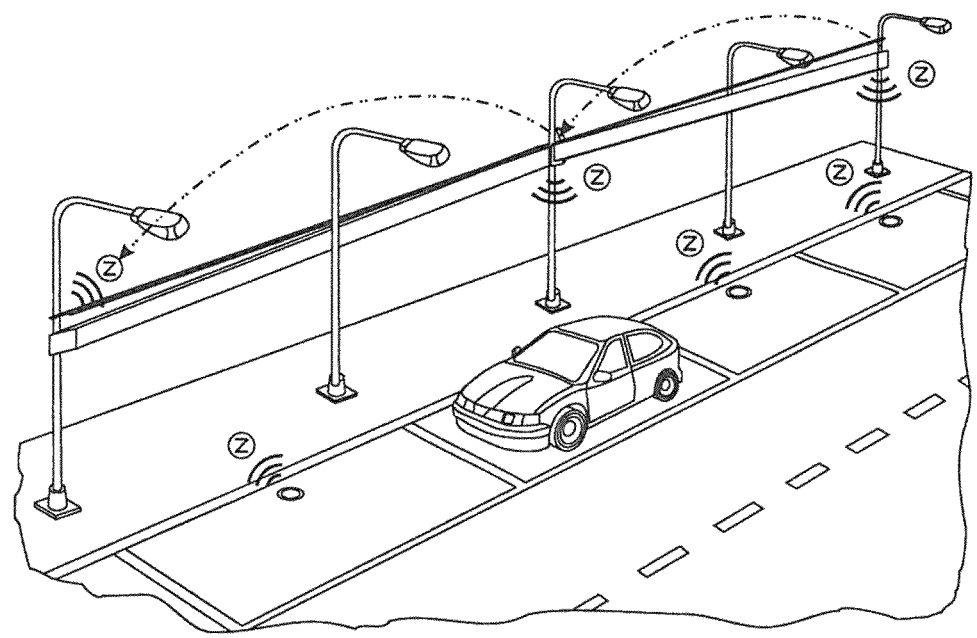
FIG. 1 shows a "puck-style" sensor-based method for detecting parking space occupancy according to the PRIOR ART.
Figure 2:
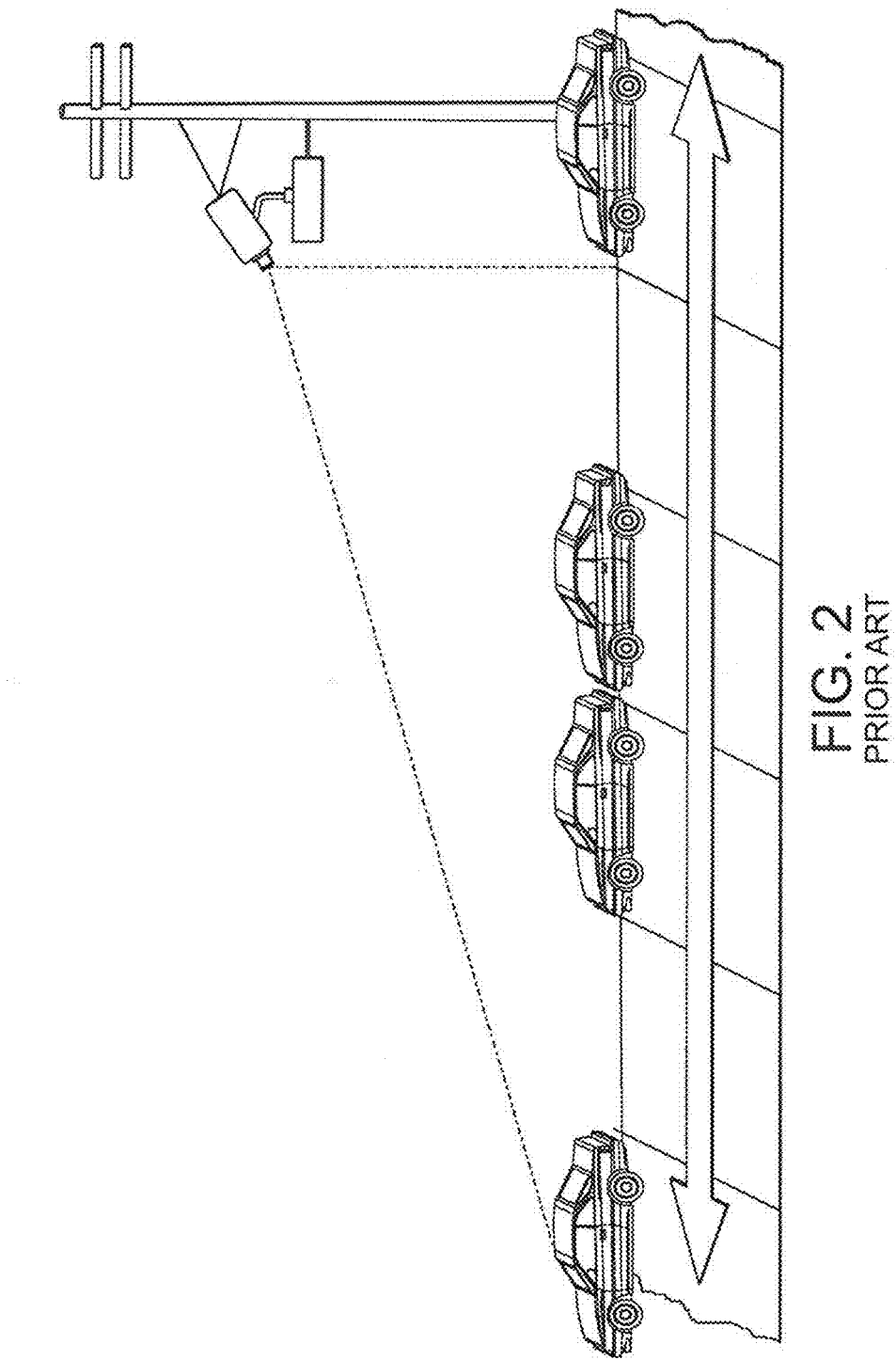
FIG. 2 shows a video-based method for detecting parking space occupancy according to the PRIOR ART.
Figure 3:
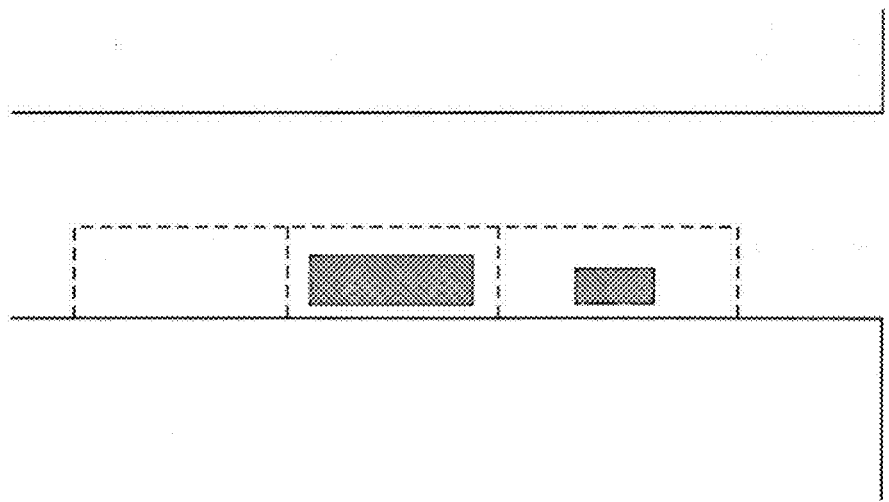
FIG. 3 shows a single-space parking configuration.
Figure 4:
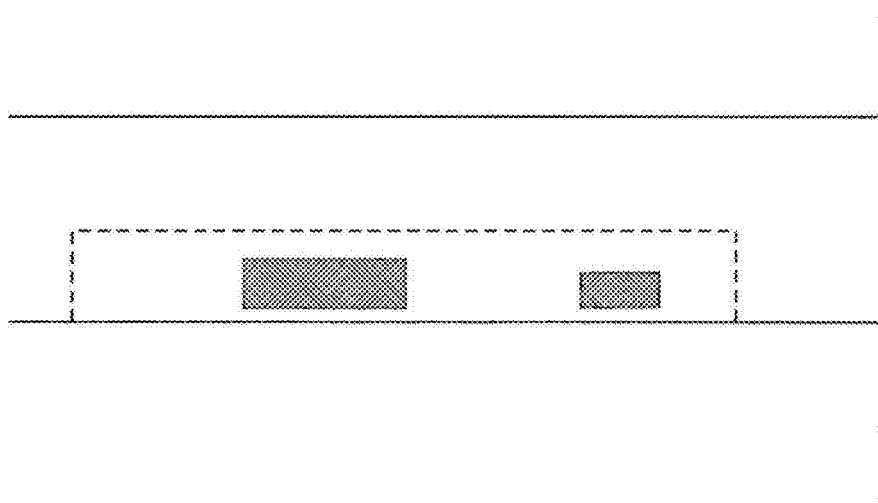
FIG. 4 shows a multiple-space parking configuration.
Figure 5:
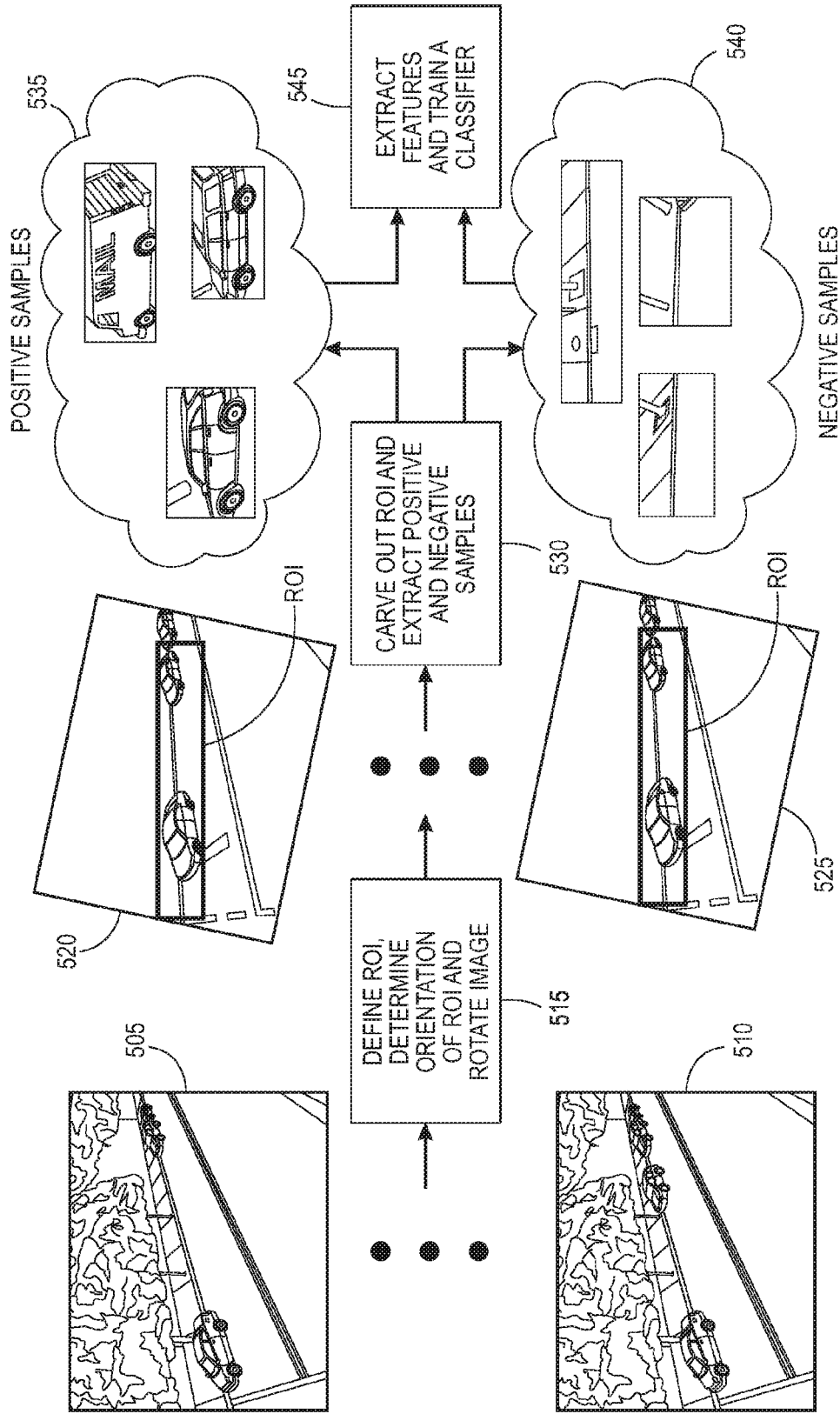
FIG. 5 is a flow chart of an offline training method associated with a vehicle detection method according to an exemplary embodiment of this disclosure.

FIG. 5 shows a high level overview of the offline (training) phase illustrating the individual steps performed. Described below is each step in further detail.

a) Obtaining video from a parking occupancy camera, 605 and 610.

One or more video frames are obtained (e.g., captured) from a fixed camera that monitors a parking region of interest. The length of the captured video depends on the level of activity in the parking region to gather enough training samples. For low activity parking regions, video acquired over a relatively longer time frame may be required. If monitoring at night is desired, NIR (near infrared) cameras may be beneficial, and/or the use of external illumination sources. Relatively inexpensive NIR cameras are readily available, as the low-end portion of the near-infrared spectrum, i.e. 700 nm-1000 nm, can be captured with equipment that is designed to capture visible light.

To estimate available parking space for a vehicle, a calibration procedure is performed. For example, as shown in FIG. 6, the distance between two white marks on the calibration tape is 2 feet; however, other marking intervals can be used. The calibration allows for the mapping of the distance in the image to the actual physical distance. For example, the calibration information is used to estimate the actual size of detected vehicles in video processing and then to set up a threshold for object classification based on the actual size of the detected object in the video image.

b) Extract positive samples (i.e., sides of different vehicles parked along the street facing traffic lane) and negative samples (e.g., portions of background images of a street without vehicles or front/rear portions of parked vehicles) from the captured video.

From the captured video, positive (vehicle side-view) and negative (everything else) samples are extracted. The samples can be extracted either manually from the carved out region or automatically using a hierarchical training approach.

Figure 7:
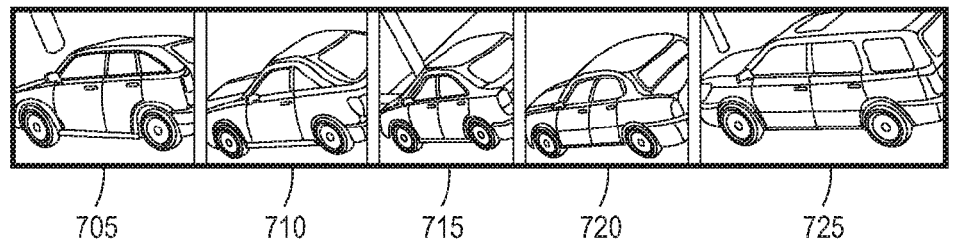
FIG. 7 is a set of positive samples extracted from a region of interest according to an exemplary embodiment of this disclosure.
Figure 8:
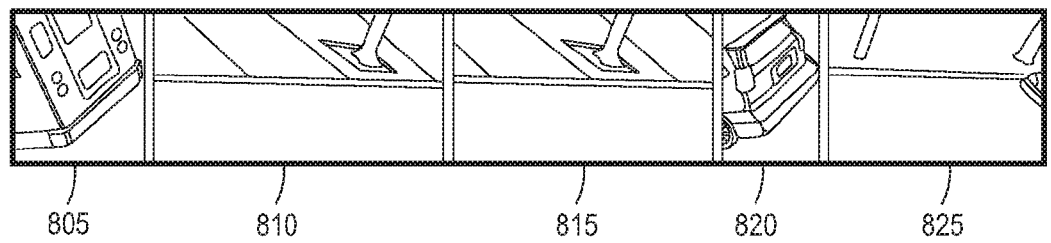
FIG. 8 is a set of negative samples extracted from a region of interest according to an exemplary embodiment of this disclosure.

FIGS. 7 and 8 show a set of positive 705, 710, 715, 720, 725 and negative 805, 810, 815, 820, 825 samples extracted from the carved out region, respectively. Note that in step b of the offline phase, the region of interest, i.e., parking region, on the image plane is typically defined by the size of a passenger vehicle to cover it fully in the region. This ensures that when a positive sample is extracted from the carved out region, it mostly includes vehicle in the extracted patch of video rather than the background of the video, i.e. buildings, pedestrians, etc. In the event of a parked large vehicle, a portion of the vehicle, i.e. the upper portion, may be cropped out of the region of interest as shown in FIG. 7. This however, is not an issue for parking occupancy detection applications according to this disclosure because vehicle height is not a concern for the expected vehicle profiles.

In contrast to conventional vision-based object detection, i.e. vehicle detection, methods where training samples contain the entire object with little or no background, the disclosed method includes variable amounts of background depending on the region of interest, the vehicle size, and its location on the street. In essence, the classifier is trained to recognize/detect vehicles through a pre-defined mask with a distorted camera view. It is this variant that enables reducing a typical 4-D search (x-direction, y-direction, object height, object length) to a 2-D search (x-direction and object length). This will be discussed below. Furthermore, since parked vehicles tend to have consistent relative positions relative to the street curb, the disclosed method does not suffer from accuracy degradation by including such variable amounts of background.

The classifier is trained to detect the side of the parked vehicle instead of the whole vehicle. This enables more accurate length estimation especially when the image plane is oblique to the street direction.

A region of interest (ROI) can be defined that corresponds to the parking region in the captured video, 615. The location of the parking region on the image plane associated with the captured video depends on the geometric configuration of the camera set-up and can be specified manually at camera set-up/installation. For example, the parking region may be specified by a polygon, an ellipse or any other closed geometric shape. The region of interest within the image plane may be defined based on a typical passenger vehicle size, where the ROI includes complete coverage or partial coverage of the typical passenger vehicle in the parking region, while not including much of the background region nor including a vehicle when a vehicle is parked in the region.

Once the parking region is defined with respect to the image plane, the ROI is carved out from the image. Positive (vehicle side-view) 620 and negative (others) 625 samples are then extracted from the carved out region, i.e., parking region. These samples may be extracted either manually from the carved out region or automatically using a hierarchical training approach as described in co-pending patent application by Wu et al. "Automated In-Field Hierarchical Training of Vehicle Detector For General Deployment of Vehicle Detection Cameras, hereby incorporated by reference.

c) Extract a set of features from positive and negative samples and training a classifier using the extracted features and the class labels for each sample, 630.

After a sufficient set of positive samples and negative samples are collected, a classifier may be trained using a machine learning approach. The machine learning approach is achieved by initially extracting a set of features from the collected samples. These features may be extracted in a variety of ways including the following:

Dimensionality reduction techniques such as principal component analysis (PCA) or linear discriminant analysis (LDA).

Texture based features such as histogram of oriented gradients (HOG), see N. Dalal and B. Triggs "Histograms of Oriented Gradients for Human Detection", in 2005 CVPR, local binary patterns (LBP) and T. Ojala, M. Pietikainen, and D. Harwood, "A Comparative Study of Texture Measures with Classification Based on Feature Distributions", 1996 Pattern Recognition, vol. 29, pp. 51-59, or successive mean quantization transform features (SMQT), see M. Nilsson, J. Nordberg, and I. Claesson, "Face Detection using local SMQT Features and Split Up SNoW Classifier", IEEE International Conference on Acoustics, Speech, and Signal Processing, 2007.

Features based on color attributes (e.g., color histogram).

Scale invariant features such as scale invariant feature transform (SIFT) features or speeded up robust features (SURF).

Local image descriptors such as bag of visual words (BOW), see G. Csurka, C. Dance, J. Willamowski, L. Fan and C. Bray, "Visual categorization with bags of keypoints", ECCV SLCV, 2004, or Fisher vectors, see F. Perronnin and C. Dance, "Fisher kernels on visual vocabularies for image categorization", CVPR, 2007 and F. Perronnin, J. Sanchez and T. Mensink, "Improving the Fisher kernel for large-scale image classification", ECCV, 2010.

Any combination of the features listed above may be used to provide a final feature vector. A linear/non-linear classifier, such as a linear Support Vector Machine (SVM), may then be trained by feeding the features extracted from the set of training samples and the class labels, i.e. vehicle and non-vehicle, of the training samples, i.e. an indication of positive or negative for each training sample, to the classifier.

It is to be understood that while the disclosed embodiments use a two class classifier, i.e. vehicle side and non-side, it is within the scope of this disclosure to train a classifier with three or more classifications, such as type 1 vehicle side, type 2 vehicle side, non-side, etc., where a plurality of "positive" sample types would be used, and possibly a plurality of "negative" sample types.

Details of the Online Phase.

Figure 9:
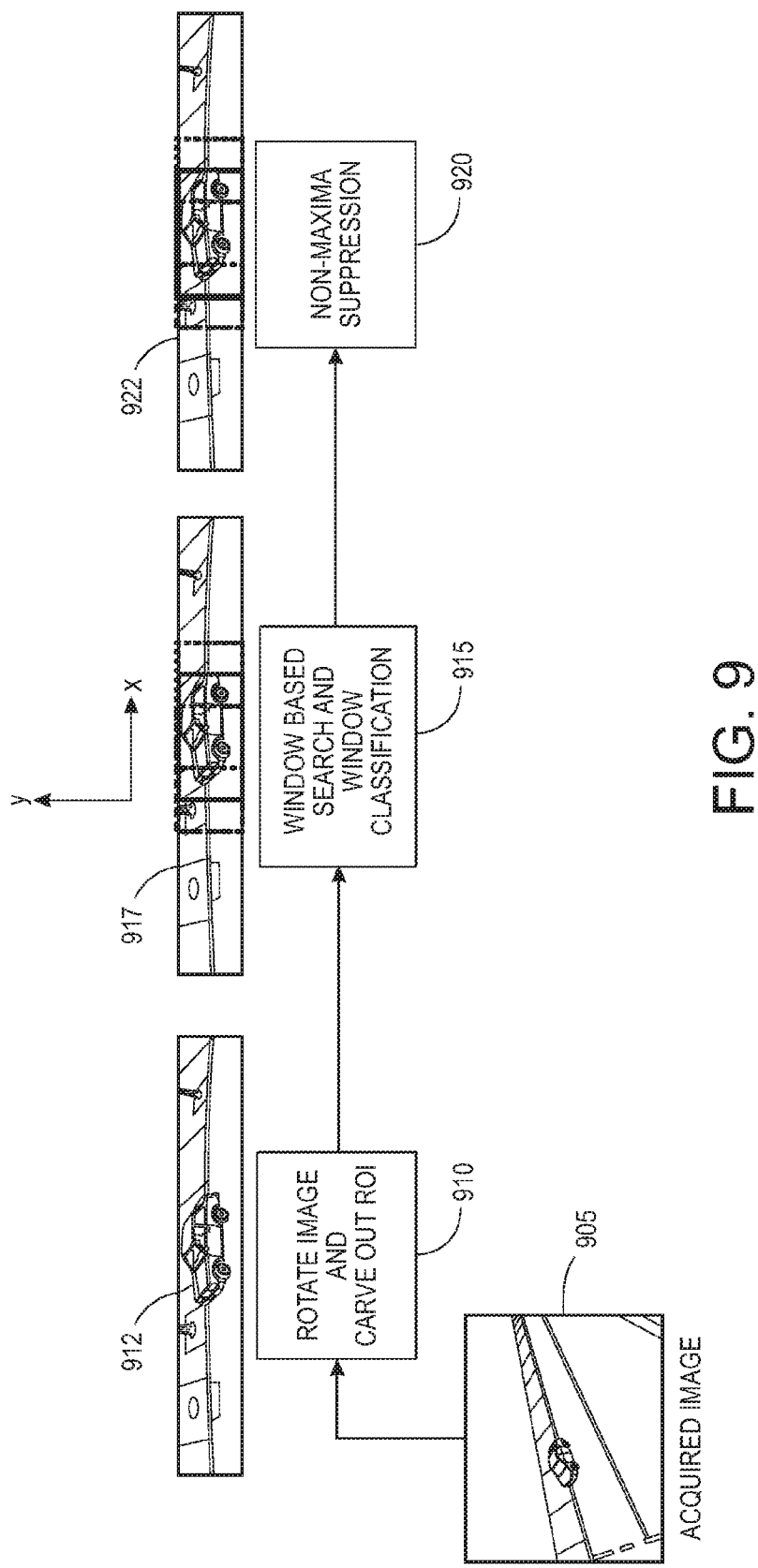
FIG. 9 is a flow chart of an online vehicle detection method according to an exemplary embodiment of this disclosure.

FIG. 9 shows a high level overview of the online phase. Described below is each step in further detail.

d) Obtaining an image/video frame 905 from the video camera.

Once the offline processing is completed, the online phase begins by acquiring images/video frames from the same camera used to monitor the region of interest for the offline phase.

e) Detect the side of vehicles parked along the street facing the traffic lane using the classifier trained in the offline phase.

In the image obtained, the ROI is carved out, at 910, and a sliding window search is performed to detect the parked vehicle side, at 915. For example, the sliding window search can be performed as described in related co-pending patent application Ser. No. 13/835,386 filed on Mar. 15, 2013 titled "Two-Dimensional and Three-Dimensional Sliding Window-Based Methods and Systems for Detecting Vehicles." The sliding window search can be performed in 2-D, i.e., along the x-direction by varying the window width. The search can be repeated for different window widths, with the same window height, to detect vehicles of different length. For each search window, the same set of features is extracted as described in c) of the offline phase. The extracted features are then fed into the trained classifier to classify each window into one of "vehicle side" or "others" categories. Finally, a window selection procedure is applied for determining detected vehicle side. Here, a standard window selection method involving thresholding followed by a non-maximum suppression algorithm can be used, as shown at 920.

f) Estimate the available parking distance for a vehicle.

The available parking distance for a vehicle is then estimated using the outer LUT and the detected vehicle side. The parking distance can be determined from adjacently parked vehicles or can be determined from a parked vehicle and a parking region boundary. For example, the parking distance can be determined based on adjacently parked vehicles by assuming that $P_r$ is the bottom rightmost pixel of the detected vehicle side on the left and $P_l$ is the bottom leftmost pixel of the detected vehicle side on the right, the distance between the two vehicles can be calculated as:

$$\text{Dist}=\text{LUT}_{outer}(P_l)-\text{LUT}_{outer}(P_r)$$

The distance between the detected vehicles can also be calculated using other features of the detected vehicle side, including, but not limited to, other locations for the rear of the left vehicle side and the front of the right vehicle side. In these instances, the parking region can be characterized by having a leading end and a trailing end. The parking distance can be determined between a parked vehicle by using the front of the vehicle side to the leading edge (left edge) or using the rear of the vehicle side to the trailing edge (right edge). In these instances, $P_l$ can be defined for the lead edge to be a distance that the parked vehicle is from the curb at the lead edge of the region and $P_r$ can be defined to be a distance from the curb at the rear edge of the region.

Figure 10:
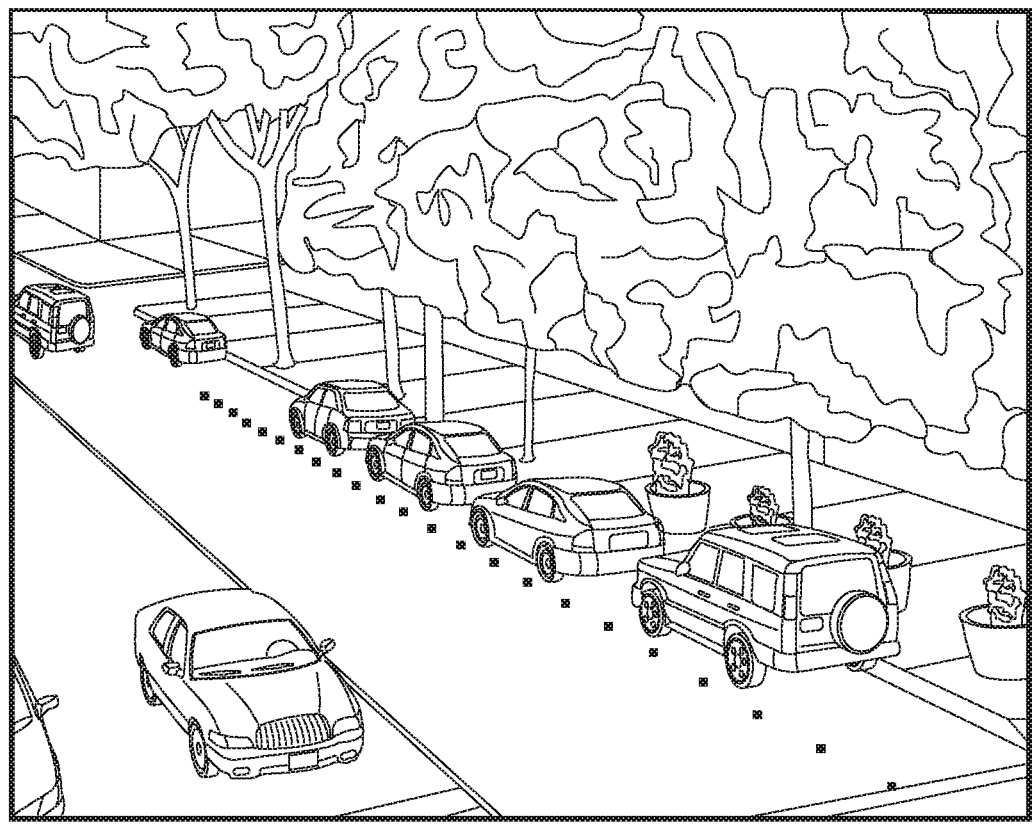
FIG. 10 is a sample captured video frame illustrating a field of view of a camera installed on a city block according to an exemplary embodiment of this disclosure.

The parking space estimation system was tested using a camera installed in a city block, which recorded several days of video from 7:30 am to 7:00 pm. The recorded videos were taken at 5 frames per second (fps) frame-rate with a resolution of 640×512. FIG. 10 shows the field of view of the camera used to capture the video in the city block.

Captured videos were manually scanned and positive and negative samples were extracted for training. From these positive and negative samples, the HOG features were calculated. The calculated features along with the class labels for each sample were then used to train a linear SVM classifier. The trained classifier was then tested with the rest of the video processing algorithm that was developed for parking occupancy detection. For this purpose, 10 days of video were recorded from the same camera that are different from the days used for training. In terms of detection performance, more than 90% accuracy was achieved, where the accuracy rate was calculated as:

$$\text{Rate}=(FP+FN)/N$$

where N is the total number of vehicles parked and, FP and FN are the number of false positive and false negatives, respectively. FIG. 10 shows a time instance from one of the testing days and the detected vehicle sides. Note that from this camera, only the parked vehicles from the lower right up to the middle of the block were tested. Therefore, the algorithm detected only four vehicle sides in the scene. In FIG. 10 white markers were overlaid on top of the image plane using the outer LUT for visualization purposes. The distance between the markers was 5 ft. The available distance between the detected vehicles was calculated using the location of the detected vehicle sides and the LUT. The algorithm in this case estimated the distance between the vehicles as 4 ft., 3 ft., and 5 ft., respectively, from left to right.

Figure 11:
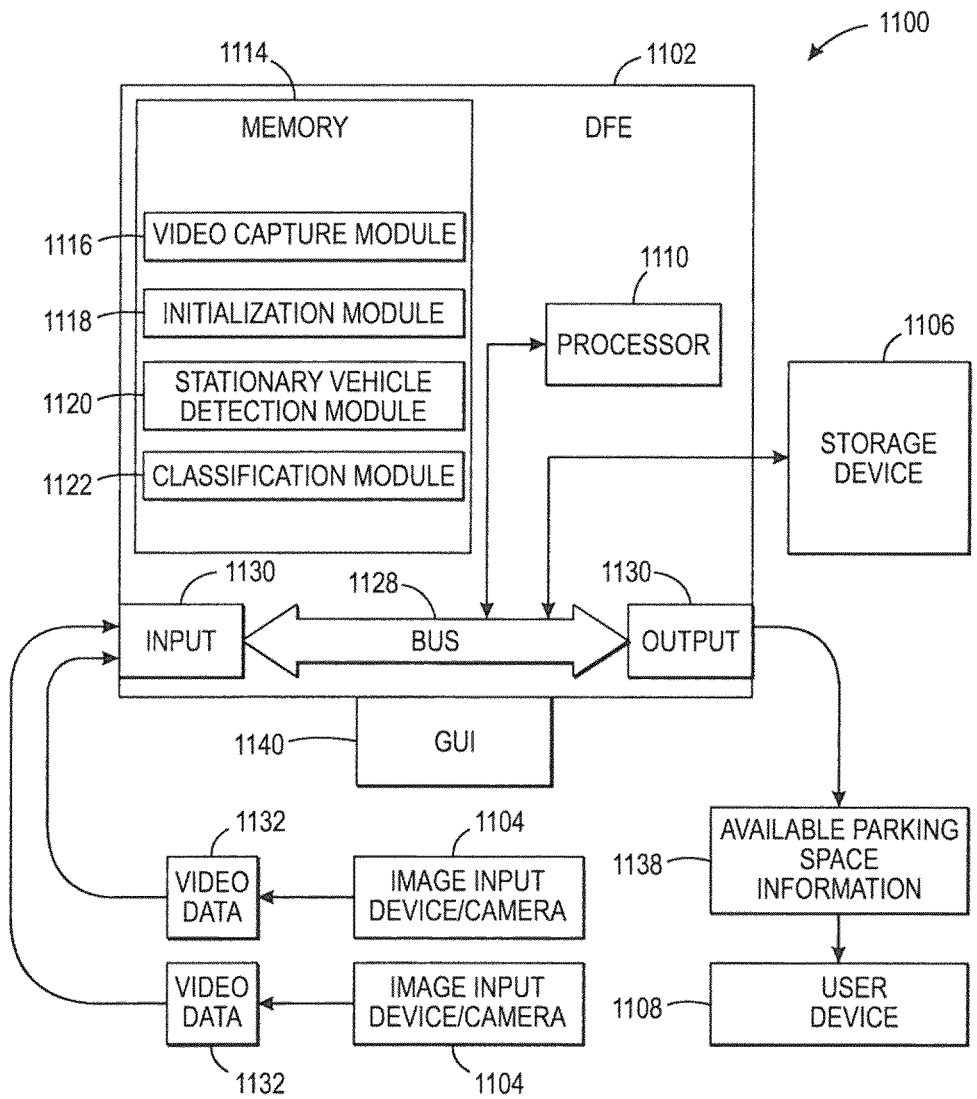
FIG. 11 is a block diagram of a vehicle detection system according to an exemplary embodiment of this disclosure.

FIG. 11 is a schematic illustration of a parking space determination system 1100 according to one exemplary embodiment, the system including a vehicle detection system as described herein. The system includes a determination device 1102, an image capture device 1104, and a storage device 1106, which may be linked together by communication links, referred to herein as a network. In one embodiment, the system 1100 may be in further communication with a user device 1108. These components are described in greater detail below.

The determination device 1102 illustrated in FIG. 11 includes a controller that is part of or associated with the determination device 1102. The exemplary controller is adapted for controlling an analysis of video data received by the system 1100. The controller includes a processor 1110, which controls the overall operation of the determination device 1102 by execution of processing instructions that are stored in memory 1114 connected to the processor 1119.

The memory 1114 may represent any type of tangible computer readable medium such as random access memory (RAM), read only memory (ROM), magnetic disk or tape, optical disk, flash memory, or holographic memory. In one embodiment, the memory 1114 comprises a combination of random access memory and read only memory. The digital processor 1110 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 1102, executes instructions stored in memory 1114 for performing the parts of a method discussed herein. In some embodiments, the processor 1110 and memory 1114 may be combined in a single chip.

The determination device 1102 may be embodied in a networked device, such as the image capture device 1104, although it is also contemplated that the determination device 1102 may be located elsewhere on a network to which the system 1100 is connected, such as on a central server, a networked computer, or the like, or distributed throughout the network or otherwise accessible thereto. The video data analysis, i.e. vehicle detection, phases disclosed herein are performed by the processor 1110 according to the instructions contained in the memory 1114. In particular, the memory 1114 stores a video capture module 1116, which captures video data of a parking area of interest; an initialization module 1118, which initializes the system; and a stationary vehicle detection module 1120, which detects vehicles that are in the parking area of interest; a classification module 1122, which classify whether a ROI includes a vehicle parked in the area of interest. Embodiments are contemplated wherein these instructions can be stored in a single module or as multiple modules embodied in the different devices.

The software modules as used herein, are intended to encompass any collection or set of instructions executable by the determination device 1102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries. Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 1102 may be all connected by a bus 1128.

With continued reference to FIG. 11, the determination device 1102 also includes one or more communication interfaces 1130, such as network interfaces, for communicating with external devices. The communication interfaces 1130 may include, for example, a modem, a router, a cable, and and/or Ethernet port, etc. The communication interfaces 1130 are adapted to receive video and/or image data 1132 as input.

The determination device 1102 may include one or more special purpose or general purpose computing devices, such as a server computer or digital front end (DFE), or any other computing device capable of executing instructions for performing the exemplary method.

FIG. 11 further illustrates the determination device 1102 connected to an image source 1104 for inputting and/or receiving the video data and/or image data (hereinafter collectively referred to as "video data") in electronic format. The image source 1104 may include an image capture device, such as a camera. The image source 1104 can include one or more surveillance cameras that capture video data from the parking area of interest. For performing the method at night in parking areas without external sources of illumination, the cameras 1104 can include near infrared (NIR) capabilities at the low-end portion of a near-infrared spectrum (700 nm-1000 nm).

In one embodiment, the image source 1104 can be a device adapted to relay and/or transmit the video captured by the camera to the determination device 1102. For example, the image source 1104 can include a scanner, a computer, or the like. In another embodiment, the video data 1132 may be input from any suitable source, such as a workstation, a database, a memory storage device, such as a disk, or the like. The image source 1104 is in communication with the controller containing the processor 1110 and memories 1114.

With continued reference to FIG. 11, the system 1100 includes a storage device 1106 that is part of or in communication with the determination device 1102. In a contemplated embodiment, the determination device 1102 can be in communication with a server (not shown) that includes a processing device and memory, such as storage device 1106.

With continued reference to FIG. 11, the video data 1132 undergoes processing by the determination device 1102 to output a determination 1138 regarding parking space availability to an operator in a suitable form on a graphic user interface (GUI) 1140 or to a user device 1108, such as a smart phone belonging to a driver in transit or to vehicle computer and/or GPS system, that is in communication with the determination device 1102. The GUI 1140 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 1110.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CO-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for determining an estimated available parking distance for a vehicle via vehicle side detection in one or more image frames from an operational video, the operational video acquired from a fixed parking occupancy video camera comprising a field of view associated with a parking region, the method comprising:
    obtaining operational video from a fixed parking occupancy video camera;
    detecting, within a region of interest (ROI) of the one or more image frames from the operational video, a side of one or more vehicles parked in a parking region facing a traffic lane using a trained classifier that is trained to detect the side of the one or more vehicles; and
    determining an estimated available parking distance based on the side of the one or more vehicles that are detected and a look-up table (LUT), wherein the LUT stores various image pixel locations and their corresponding real-world coordinates of an outer boundary of the parking region.

2. The computer-implemented method according to claim 1, wherein the estimated available parking distance is between adjacently parked vehicles, a front portion of a parked vehicle and a parking lane boundary, or a rear portion of a parked vehicle and a parking lane boundary.

3. The computer-implemented method according to claim 1, wherein the fixed parking occupancy video camera comprises a field of view, wherein an image plane of the fixed occupancy video camera is oblique or parallel to a street direction on which the one or more vehicles are parked.

4. The computer-implemented method according to claim 1, further comprising training the classifier, wherein training the classifier comprises:
    obtaining additional video from the fixed parking occupancy video camera;
    extracting one or more positive samples and one or more negative samples from the additional video that was obtained;
    extracting a set of features from the one or more positive samples and a set of features from the one or more negative samples; and
    training the classifier via machine learning techniques.

5. The computer-implemented method according to claim 1, wherein detecting the side of the one or more vehicles further comprises performing a sliding window-based space search for the side of the vehicle within video that was obtained.

6. The computer-implemented method according to claim 5, wherein the sliding window-based space search comprises extracting one or more features associated with each of a plurality of windows and accessing an operatively associated classifier to classify each window as including the side of the vehicle or not including the side of the vehicle.

7. The computer-implemented method according to claim 2, wherein the distance between two vehicles is estimated based on the pixel locations of the corners of two vehicles that are facing the traffic lane between the two vehicles in the ROI.

8. The computer-implemented method according to claim 4, wherein the set of features comprise one or more local image descriptors.

9. The computer-implemented method according to claim 8, wherein the one or more local image descriptors comprise any, or combinations of, a color attribute-based features, texture-based features, scale invariant features, a bag of visual words, and Fisher vectors.

10. The computer-implemented method according to claim 4, wherein the one or more positive samples and the one or more negative samples are extracted from a carved out region of the video using a hierarchical training approach.

11. The computer-implemented method according to claim 4, wherein the one or more positive samples comprise images of sides of different vehicles parked along a street facing traffic lane.

12. The computer-implemented method according to claim 4, wherein the one or more negative samples comprises any, or combinations of, a background image from the parking region, a rear portion of the parked vehicles in the video, a middle portion of the parked vehicles, and a front portion of the parked vehicles in the video.

13. The computer-implemented method according to claim 1, wherein the classifier comprises a linear classifier, wherein the linear classifier is a linear Support Vector Machine (SVM).

14. The computer-implemented method according to claim 1, wherein the classifier comprises a non-linear classifier.

15. The computer-implemented method according to claim 1, wherein the classifier is trained using features extracted from a set of training samples and one or more labels of the training samples.

16. The computer-implemented method according to claim 1, wherein the classifier is trained using a machine learning process.

17. A vehicle detection system associated with a parking region, the vehicle detection system comprising:
    a fixed parking occupancy video camera including a field of view associated with a parking region; and
    a controller operatively associated with the fixed parking occupancy video camera, the controller configured to execute computer instructions to perform a process of determining an estimated distance between vehicles from one or more image frames in operational video including:
    obtaining operational video from a fixed parking occupancy video camera;
    detecting, within a region of interest (ROI) of the one or more image frames from the operational video, a side of one or more vehicles parked in a parking region facing a traffic lane using a trained classifier that is trained to detect the side of the one or more vehicles; and
    determining an estimated parking distance based on the side of the one or more vehicles that are detected, wherein the estimated available parking distance is between adjacently parked vehicles, a front portion of a parked vehicle and a parking lane boundary, or a rear portion of a parked vehicle and a parking lane boundary and the distance between two vehicles is estimated based on the pixel locations of the corners of two vehicles that are facing the traffic lane between the two vehicles in the ROI.

18. A non-transitory computer readable storage medium comprising instructions that cause one or more processors to perform a method comprising:

obtaining operational video from a fixed parking occupancy video camera detecting, within a region of interest (ROI) of the one or more image frames from the operational video, a side of one or more vehicles parked in a parking region facing a traffic lane using a trained classifier that is trained to detect the side of the one or more vehicles; and determining an estimated parking distance based on the side of the one or more vehicles that are detected, wherein the estimated available parking distance is between adjacently parked vehicles, a front portion of a parked vehicle and a parking lane boundary, or a rear portion of a parked vehicle and a parking lane boundary and the distance between two vehicles is estimated based on the pixel locations of the corners of two vehicles that are facing the traffic lane between the two vehicles in the ROI.

* * * * *